United States Patent [19]

Perry et al.

[11] 4,249,202

[45] Feb. 3, 1981

[54] CIRCUIT FOR FREQUENCY SELECTIVE CORING OF A VIDEO SIGNAL

[75] Inventors: Vinson R. Perry, San Carlos; John O. Ryan, Cupertino, both of Calif.

[73] Assignee: Ampex Corporation, Redwood City, Calif.

[21] Appl. No.: 37,345

[22] Filed: May 9, 1979

[51] Int. Cl.³ .............................................. H04N 5/14
[52] U.S. Cl. ..................................... 358/36; 358/162; 358/167; 330/276
[58] Field of Search .................... 358/162, 167, 36, 37; 330/276; 455/63, 296, 303, 305

[56] References Cited

U.S. PATENT DOCUMENTS

| | | | |
|---|---|---|---|
| 3,117,278 | 1/1964 | Johnson | 325/65 |
| 3,289,092 | 11/1966 | Hanson | 330/276 |
| 3,381,235 | 4/1968 | Campbell | 330/276 |
| 3,485,942 | 12/1969 | Melchior | 358/36 |
| 3,715,477 | 2/1973 | Olson | 358/167 |
| 3,814,847 | 6/1974 | Longuet | 358/162 |
| 3,995,108 | 11/1976 | Morrison | 358/162 |
| 4,142,211 | 2/1979 | Faroudia | 358/36 |

Primary Examiner—Robert L. Griffin
Assistant Examiner—Michael A. Masinick
Attorney, Agent, or Firm—Robert G. Clay; George B. Almeida

[57] ABSTRACT

A coring circuit located prior to the aperture corrector circuit provides fast acting, remotely controlled, temperature compensated, frequency selective coring of the video signal. The wideband video signal is separated into its low frequency and high frequency components. The high frequency component is transformer coupled to a coring means proper which cores out the corresponding high frequency noise. The cored high frequency component then is recombined with the low frequency component to reconstitute the cored composite video signal for subsequent application to the aperture correction circuit.

5 Claims, 2 Drawing Figures

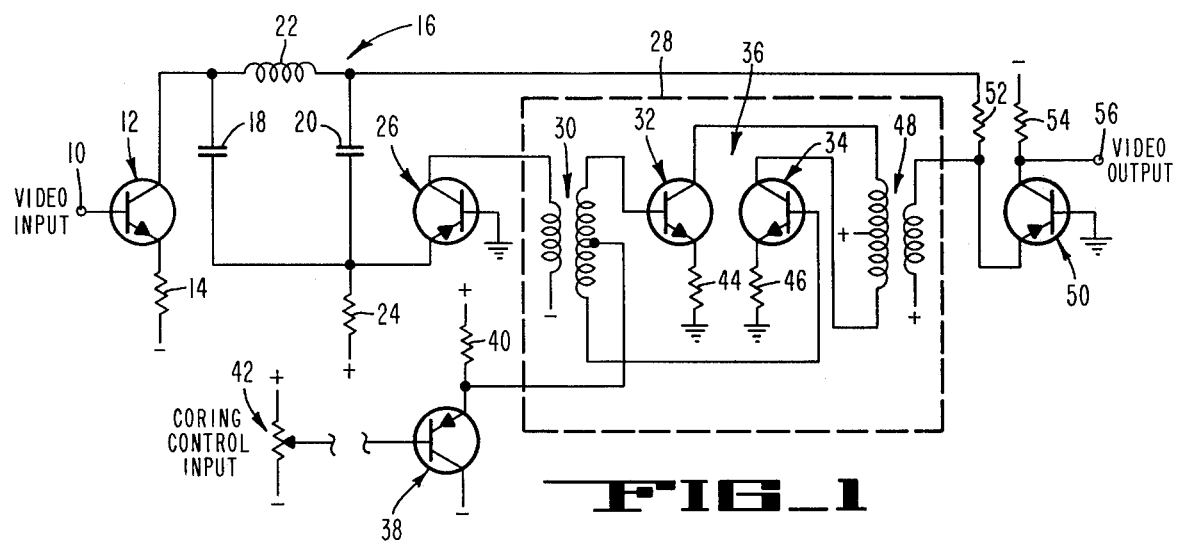
FIG_1
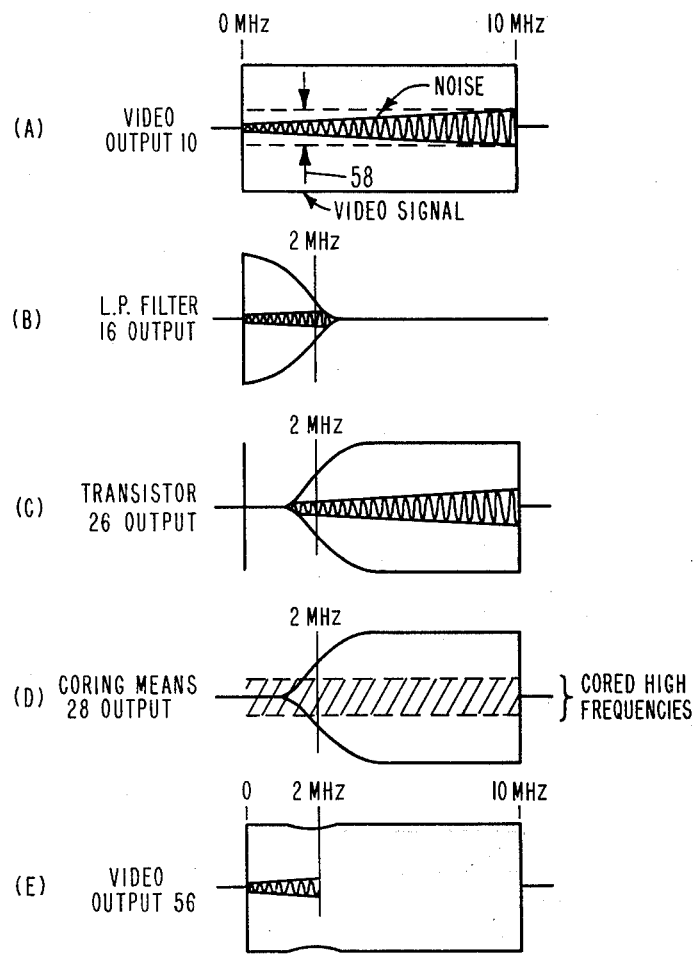
FIG_2

CIRCUIT FOR FREQUENCY SELECTIVE CORING OF A VIDEO SIGNAL

BACKGROUND OF THE INVENTION

1. The invention relates to a process for coring a video signal and particularly to the frequency selective coring of a video signal prior to performing aperture correction.

2. Prior Art

In video processing systems, compromises generally are made when attempting to improve a video detail signal with conventional aperture correction and coring techniques. Coring techniques are used to remove objectionable noise which is emphasized during the aperture correction of the video signal, while optimizing the original shape of the high frequency video detail transitions enhanced by the aperture correction process. Since noise generally increases at the rate of six decibels (db) per octave, the larger quantity of noise exists in the high frequency signal components. Although high frequency noise is not as noticeable to the eye as low frequency noise, the former often is translated when processed, by way of aperture correction, and reappears looking like low frequency noise. The conventional coring techniques core a slice out of the entire signal bandwidth which also removes picture information, particularly at the low frequency end of the spectrum. Typical of such a coring technique is that exemplified in U.S. Pat. No. 3,995,108 to F. Morrison, assigned to the same assignee as this application.

However, use of a coring process after the aperture correction process is, as previously mentioned, a compromise, since it is commonly known that coring the complete detail signal over its entire bandwidth, after aperture correction, generates a loss of low frequency detail information, which is most noticeable during low light levels. Further, the level of coring is compromised since the signal-to-noise ratio when coring after aperture correction is lower than when coring before correction.

SUMMARY OF THE INVENTION

Accordingly, it is an object of the invention to provide a simple coring circuit which provides an improved video detail signal by coring before aperture correction.

Another object of the invention is to provide frequency selective coring of the video signal prior to aperture correction.

A further object of the invention is to core a video signal while retaining the low frequency detail information.

To this end, the video signal is low pass filtered and fed to a summing amplifier. The complimentary high passed video signal is derived from the current return path of the low pass filter and is transformer coupled to a coring means proper. The latter is formed of a pair of transformers intercoupled via a balanced amplifier, which, in effect, provides the coring function by a controlled rectifying action. To this end, the conduction of the balanced amplifier is controlled via coring control voltage fed to a center tap of one transformer secondary. The cored high frequency signal is recombined in the second transformer and is added to the low passed video signal via the summing amplifier to provide the cored composite video signal. The latter is then fed to the aperture corrector circuitry.

BRIEF DESCRIPTION OF THE DRAWINGS

FIG. 1 is a schematic diagram depicting an implementation of the coring circuit of the invention combination.

FIGS. 2A–2E are graphs of waveforms depicting the coring technique of the circuit of FIG. 1 with respect to the video signal bandwidth.

DESCRIPTION OF THE PREFERRED EMBODIMENTS

Referring to FIG. 1, a broadband video signal, as generated, for example, via a camera head system, is supplied via input 10 to a current source 12. The latter is formed of a transistor whose base is coupled to the input 10, whose emitter is coupled to a negative voltage via a resistor 14, and whose collector feeds a low pass filter 16. The filter 16 includes a pair of capacitors 18, 20 coupled to respective ends of an inductor 22 and thence to a positive voltage via a resistor 24. The junction of capacitors 18, 20 and resistor 24 defines the current return path for the low pass filter and thus a high pass filter, which is coupled to the emitter of an amplifier transistor 26. The base of the latter is grounded, and the collector is transformer coupled to a coring means 28 and particularly to a primary winding of a transformer 30 thereof. The other side of the primary winding is coupled to a negative voltage.

The secondary winding of transformer 30 is coupled at either end to the bases of a pair of transistors 32, 34 which form a balanced amplifier 36. The center tap of the secondary winding is coupled to the emitter of a biasing transistor 38. The emitter thereof is coupled to a positive voltage via a resistor 40, the collector is coupled to a negative voltage, and the base is coupled to a variable voltage source 42 which comprises a coring control input for determining the voltage supplied by the biasing transistor 38 and thus the degree of conduction of the balanced amplifier 36. The voltage source 42 may be remotely located as in a central control unit of a camera system.

The emitters of the transistors 32, 34 are coupled to ground via resistors 44, 46, and the collectors thereof are connected to opposite ends of the primary winding of a transformer 48. A center tap of the primary winding is coupled to a positive voltage, and the secondary winding is coupled to a positive voltage at one end, and to an emitter of a summing amplifier 50 at the other end.

The low passed signal from the filter 16 also is coupled to the emitter of the summing amplifier 50 via a resistor 52. The base of the latter is grounded, and the collector is coupled to a negative voltage via a resistor 54 and provides the high frequency cored video signal on output 56, which may then be fed to an aperture corrector circuit (not shown).

The bandwidth of the video input signal is depicted in FIG. 2A as extending from zero to ten megaHertz (MHz), by way of example only. The undesirable noise is also depicted and increases with increasing frequency on the order of six decibels (db) per octave. It is this noise that conventional coring techniques purport to remove. However, it may be seen that coring techniques which remove a constant slice of the noise (indicated in exaggerated form by dashed lines and numeral 58) throughout the entire bandwidth, also remove much of the desirable low frequency video detail information during corresponding low light levels as shown in FIG. 2A. Loss of this low frequency detail information results in picture degradation which is readily descernible by the eye.

Thus, the coring technique described herein provides frequency selective coring wherein the noise corresponding to the high frequency components is cored out, while the low frequency detail information is retained.

To this end, the video signal from input 10, depicted by FIG. 2A, is low pass filtered, and the resulting low passed video signal with its attendant noise (FIG. 2B) is fed to the summing amplifier 50 via the resistor 52. The complimentary high passed signal with its attendant noise (FIG. 2C) appears at the common junction of capacitors 18, 20 and resistor 24, and is transformer coupled by amplifier transistor 26 to the coring means 28. By way of example only, a frequency of two megaHertz is herein selected as the upper limit of the low pass filter 16. Thus, the low pass filter 16 provides not only the low frequency component of the video signal, but also the high frequency component thereof. The transformer 30 of the coring means 28 receives the high passed video signal and, along with the balanced amplifier 36, provides, in effect, a full wave rectifying action which removes a portion of the high frequency component about its neutral point. That is, the balanced amplifier performs as a class B amplifier. The extent of the rectifying action, i.e., the conduction angle of the balanced amplifier 36, is controlled by the biasing voltage applied to the center tap of the transformer 30 secondary via the biasing transistor 38 and the variable voltage source 42. In effect, the biasing voltage determines the conduction angle and thus the type of operation of the balanced amplifier 36, i.e., class A, AB or B which, in turn, determines the extent of coring performed on the high passed video signal. Further, the variable voltage source 38 provides temperature compensation for the balanced amplifier 36.

The cored signal is then recombined by transformer 48, depicted in FIG. 2D, and is fed to the summing amplifier 50. The low passed signal from the filter 16 (FIG. 2B) is added to the cored high passed signal of FIG. 2D to provide the resultant composite video signal minus the high frequency noise on output terminal 56. As shown in FIG. 2E, the cored composite video signal retains only a small amount of noise in the low frequency component of the signal, whereby low frequency detail information is retained while noise in the high frequency portion is removed.

We claim:

1. A coring circuit for wideband video signals comprising the combination of;

low pass filter means for separating the wideband video signal into its low frequency and high frequency component signals, wherein the complimentary high frequency component signal appears at the return path of the low pass filter;

balanced amplifier means including a transformer coupled to the filter means high frequency component signal, whose degree of conduction increases with increasing video signal frequency to selectively remove a correspondingly increasing slice of noise therefrom; and summing means coupled to the balanced amplifier means and to the filter means low frequency component signal to reconstitute the cored composite video signal.

2. The circuit of claim 1 further including;

amplifier transistor means coupled to the high frequency component signal;

first transformer means coupled between the amplifier transistor means and the balanced amplifier means; and biasing transistor means coupled to the first transformer means for controlling the balanced amplifier means.

3. The circuit of claim 2 further including;

second transformer means coupled to the balanced amplifier means for recombining the high frequency component signal, for introduction to the summing means.

4. The circuit of claim 3 wherein the biasing transistor means is coupled to the first transformer means and is responsive to a variable voltage source; and the balanced amplifier means is responsive to the biasing transistor means and to the variable voltage source.

5. A coring circuit for wideband video signals comprising the combination of;

current source transistor means for receiving the video signal;

low pass filter means coupled to the current source transistor means for providing a low passed video signal and a complimentary high passed video signal;

amplifier transistor means coupled to the high passed video signal;

first transformer means coupled to the amplifier transistor means and having a center tapped secondary winding;

a variable voltage source coupled to the center tap of the secondary winding;

balanced amplifier means coupled to the first transformer means and responsive to the variable voltage source to core an increasing magnitude of noise commensurate with increasing frequencies in the high passed video signal;

second transformer means coupled to the balanced amplifier means; and summing transistor means coupled to the low passed video signal and to the second transformer means, and including means for adding the low passed video signal to the high passed video signal to reconstitute the cored composite video signal.

* * * * *